United States Patent [19]
Genevieve et al.

[11] Patent Number: 6,097,590
[45] Date of Patent: Aug. 1, 2000

[54] IMAGING DEVICE

[75] Inventors: Elisabeth Genevieve, Noiseau; Michel Nauche, Soisy-sous-Montmorency; Patrick Horel, Neuilly-sur-Marne, all of France

[73] Assignee: Essilor International Compagnie Generale d'Optique, Charenton le Pont, France

[21] Appl. No.: 09/149,113

[22] Filed: Sep. 9, 1998

[30] Foreign Application Priority Data

Sep. 11, 1997 [FR] France .................................. 97 11304

[51] Int. Cl.⁷ ........................................................ G06F 1/16
[52] U.S. Cl. ........................................................ 361/681
[58] Field of Search ...................... 348/836, 838; 312/7.2; 248/274.1, 276.1, 278.1, 917, 918, 919, 920, 921, 922, 923; 361/681, 682

[56] References Cited

U.S. PATENT DOCUMENTS

| | | | |
|---|---|---|---|
| 3,454,331 | 7/1969 | Maitenaz | 351/5 |
| 4,653,881 | 3/1987 | Joncour . | |
| 5,646,818 | 7/1997 | Hahn | 361/681 |
| 5,709,360 | 1/1998 | Rosen | 248/278.1 |
| 5,946,055 | 8/1999 | Rosen | 348/837 |

FOREIGN PATENT DOCUMENTS

| | | | |
|---|---|---|---|
| 2558714 | 8/1985 | France | A61B 3/10 |
| 2605209 | 4/1988 | France | A61B 3/02 |
| 2688679 | 9/1993 | France | A61B 3/11 |
| 9321819 | 11/1993 | WIPO | A61B 3/11 |

*Primary Examiner*—George Manuel
*Attorney, Agent, or Firm*—Young & Thompson

[57] ABSTRACT

An imaging device includes an image acquisition device to which there corresponds an imaging axis and a viewing screen to which there corresponds an observation axis and two units hinged together in the manner of a pendulum about a horizontal pivot axis at the top. One of these units is an imaging unit that includes the image acquisition device and to which the orientation of the corresponding imaging axis is tied. The other one is an observation unit which includes the viewing screen and to which the orientation of the corresponding observation axis is tied. The center of gravity of the imaging unit is below the pivot axis. There is preferably a detector responsive to the position of the observation unit. Applications include acquisition by an optician of an image of a person wearing an eyeglass frame to be fitted with lenses.

28 Claims, 2 Drawing Sheets

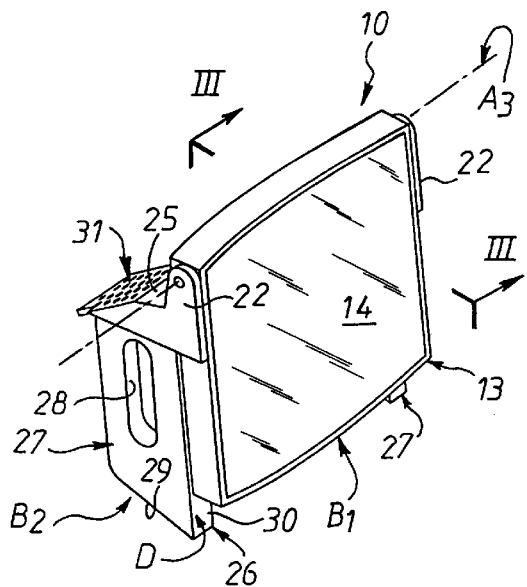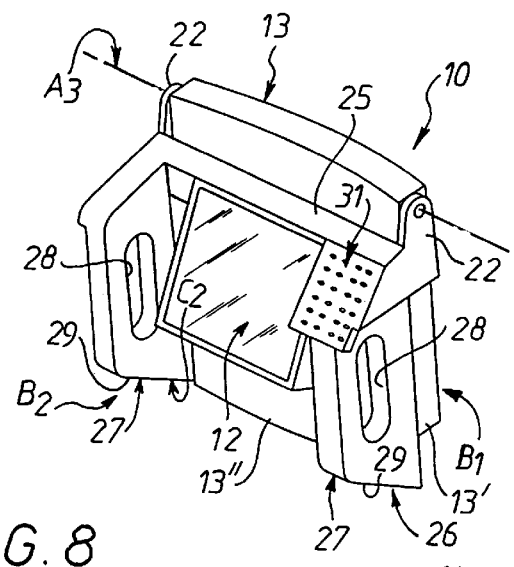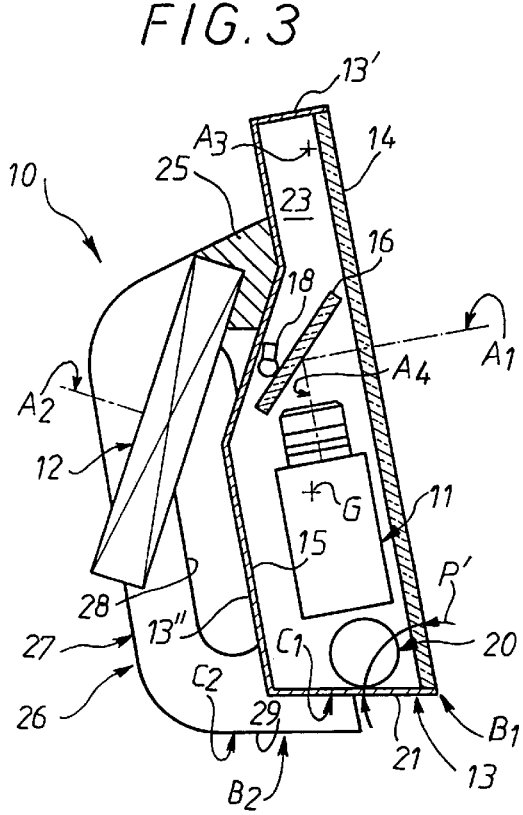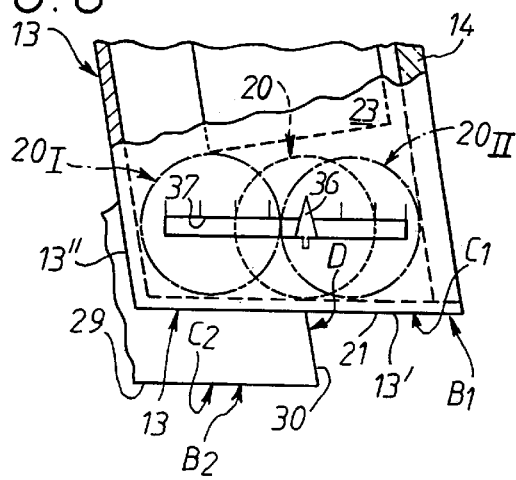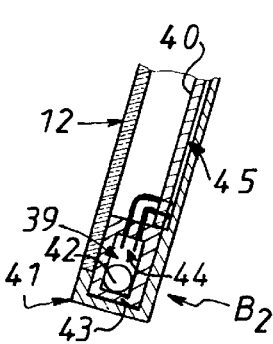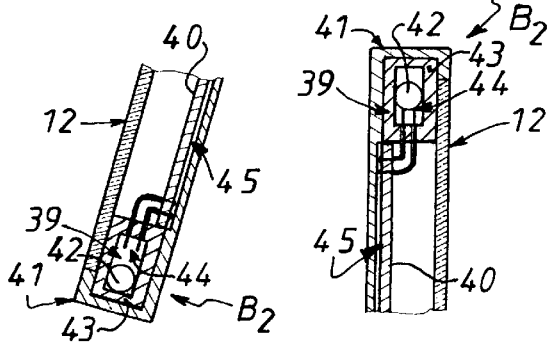

IMAGING DEVICE

BACKGROUND OF THE INVENTION

1. Field of the Invention

The present invention is generally concerned with imaging devices of the type used by opticians to perform various position measurements on a person wearing an eyeglass frame for the purpose of fitting lenses to the frame.

Briefly, the aim is to acquire an image of the person wearing the eyeglass frame in order to measure the position of their pupils relative to the rims or surround of the frame.

2. Description of the Prior Art

The imaging devices used for this purpose include an image acquisition device equipped with a video camera to perform the required imaging and to which there therefore corresponds an imaging axis and a viewing screen enabling the practitioner to control the device and to which there therefore corresponds an observation axis.

The aim is to measure on a photographic or video image the position of the optical axis or vision axis of either or both eyes of the person concerned relative to the frame of reference consisting of the eyeglass frame to be fitted with lenses. It is therefore important to allow for the fact that the person's pupils are in a plane to the rear of the median plane of the eyeglass frame spaced from this latter plane by a certain distance, which is generally in the order or 12 mm, and that for looking horizontally the median plane of the eyeglass frame is usually inclined at an angle to the vertical, commonly referred to as the pentoscopic angle, and which generally varies in the range 5° to 15°, with an average value in the order of 10°.

If these two parameters are not allowed for, the parallax error that can result can lead to a positioning error of a few millimeters between the optical axis of the lenses and the vision axis of the person, which is to the detriment of the latter's quality of vision.

A general aim of the present invention is an arrangement which overcomes this problem in a very simple and a very effective way and which also has other advantages.

SUMMARY OF THE INVENTION

To be more precise, the present invention consists in an imaging device including an image acquisition device to which there corresponds an imaging axis, a viewing screen to which there corresponds an observation axis and two units hinged together in the manner of a pendulum about a horizontal pivot axis at the top, namely an imaging unit that includes the image acquisition device and to which the orientation of the corresponding imaging axis is tied and an observation unit which includes the viewing screen and to which the orientation of the corresponding observation axis is tied, in which device the center of gravity of the imaging unit is below said pivot axis.

By virtue of this arrangement, the imaging unit hangs vertically, in particular when the practitioner is holding the observation unit to perform the required imaging.

Accordingly, the orientation of the imaging unit does not change, regardless of that of the observation unit, even though, for correct framing of the person concerned, the observation unit orientation may differ according to the height of the person and/or that of the practitioner.

Accordingly, the imaging axis can advantageously be systematically perpendicular to the median plane of the eyeglass frame, which eliminates all parallax error during imaging.

To achieve this, it is sufficient for the imaging axis, by construction, to be inclined to the horizontal at an angle equal to the pentoscopic angle of the eyeglass frame when, as indicated, the imaging unit is hanging freely and vertically.

In other words, the pivot axis of the imaging device in accordance with the invention enables a constant imaging angle to be retained for each imaging operation of its own accord, i.e. without intervention of any other compensation or control means and therefore in a manner that is particularly simple and economic.

It also has the advantage of enabling the person concerned to be shown the image previously observed and stored for this purpose, if required, simply by turning over the observation unit, or of enabling the practitioner to work alongside the person.

To achieve this, the amplitude of relative angular movement between the imaging unit and the observation unit is sufficient to enable the observation unit to occupy an inverted position in which its viewing screen is visible from the front and the image is itself inverted so that it can be seen the right way up.

The observation unit preferably includes a base enabling the device to be put down when not in use with the observation unit resting on a horizontal surface.

In accordance with a further feature of the invention, by construction, when the device is put down with the observation unit resting on a horizontal plane, the imaging axis, i.e. the viewing axis of the imaging unit, is still at an angle to the horizontal substantially equal to the pentoscopic angle of an eyeglass frame, preferably increased by approximately 15° to allow for the usual inclination of the head to the vertical in these circumstances.

The idle position of the imaging device of the invention can therefore advantageously also be a near vision imaging position.

The imaging unit of the imaging device of the invention preferably has a semi-transparent plate on the front perpendicular to the imaging axis and concealing the corresponding image acquisition device.

Accordingly, during imaging, the person concerned, who is incidentally free of any constraint, is advantageously not distracted or disturbed by the image acquisition device, which is to the benefit of the quality of the image obtained.

The features and advantages of the invention will emerge from the following description given by way of example with reference to the accompanying diagrammatic drawings.

BRIEF DESCRIPTION OF THE DRAWINGS

FIG. 1 is a perspective view of an imaging device in accordance with the invention seen from the front.

FIG. 2 is another perspective view of it seen from the rear.

FIG. 3 is a view of it in cross-section taken along the line III—III in FIG. 1 and to a larger scale.

FIG. 8 is a partly cut away side view to a larger scale of part of a different embodiment of the imaging device of the invention.

FIGS. 9 and 10 are partial views respectively corresponding to those of FIGS. 6 and 7 relating to a further feature of the invention.

DETAILED DESCRIPTION OF THE PREFERRED EMBODIMENTS

Figure 4:
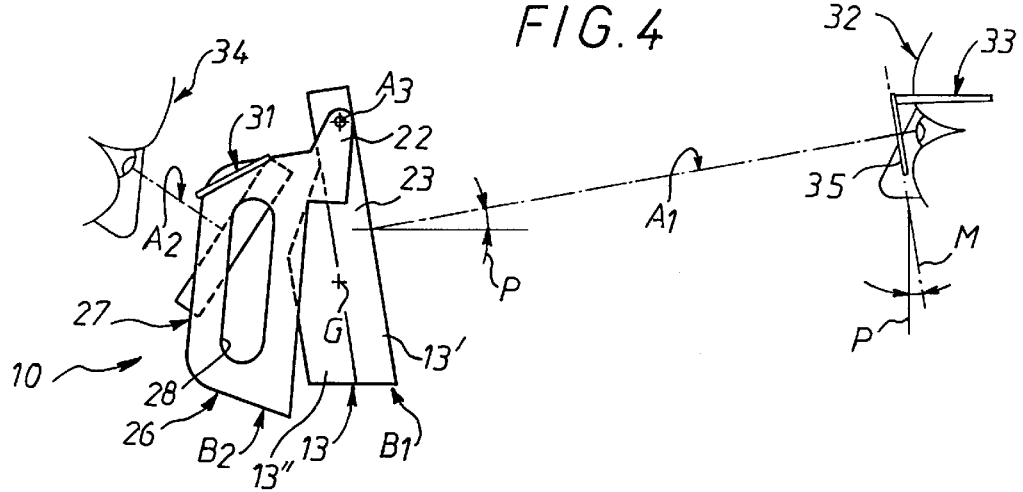
FIG. 4 is a side view to a reduced scale showing the use of the imaging device of the invention in a first mode of framing the person concerned.

As shown in the figures, and in a manner that is known in itself, the imaging device 10 of the invention includes an image acquisition device 11 to which there corresponds an imaging axis A1 and a viewing screen 12 to which there corresponds an observation axis A2 (FIG. 3).

In accordance with the invention, the imaging device 10 includes two units B1, B2 hinged together in the manner of a pendulum about a horizontal pivot axis A3 at the top, namely an imaging unit B1 which includes the image acquisition device 11 and to which the orientation of the corresponding imaging axis A1 is tied and an observation unit B2 which includes the viewing screen 12 and to which the orientation of the corresponding axis A2 is tied. By construction, the center of gravity G of the imaging unit B1 is below the pivot axis A3 of the device.

In the embodiment shown, the imaging unit B1 includes a casing 13 containing the image acquisition device 11 and various components associated with the imaging device 11, as described in more detail later.

As in the embodiment shown here, the imaging unit B1 preferably includes a semi-transparent plate 14 closing the front of the casing 13, perpendicular to the imaging axis A1 and concealing the image acquisition device 11.

The image acquisition device 11 is a video camera, for example. A video camera of this kind being well known in itself, and not of itself being any part of the invention, it will not be described here.

In the embodiment shown, the optical axis A4 of the image acquisition device 11 extends parallel to the semi-transparent plate 14 in a vertical plane and a mirror 16 inclined at 45° is therefore provided in the casing 13, between the image acquisition device 11 and the semi-transparent plate 14, to be more precise between the back of the casing 13 and the semi-transparent plate 14, in order to bend the optical axis A4 90° along the imaging axis A1.

In the embodiment shown the other components associated with the image acquisition device 11 include a light source 18 inside the imaging unit B1 and to the rear of the mirror 16, between the latter and the back 15 of the casing 13, aligned with the axis A1. It provides a point for the person to focus on.

The mirror 16 can be a semi-transparent plate to enable the person to see the light source 18.

Equally, it can have a hole in it at this location.

In the embodiment shown the other components associated with the image acquisition device 11 include a power supply device 20 for the image acquisition device 11 itself and for the light source 18.

It is a storage battery, for example.

Given its weight and the effect it therefore has on the position of the center of gravity G, the power supply device 20 is in the bottom part of the casing 13, preferably under the image acquisition device 11, between the latter and the bottom edge 21 of the casing 13.

Figure 7:
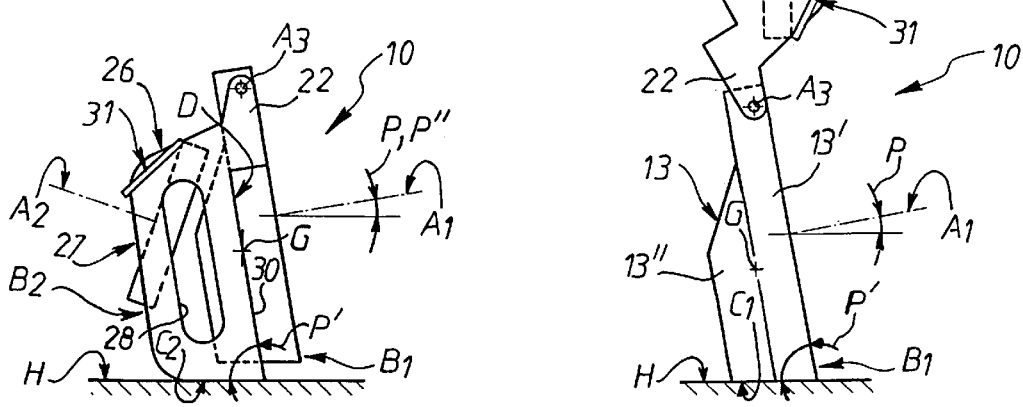
FIG. 7 is a side view similar to that of FIGS. 4, 5 and 6 for an inverted position of the imaging device.

As in the embodiment shown here, the imaging unit B1 preferably has a base C1 enabling the imaging device to be put down with its imaging unit BE resting on the horizontal plane H, as shown in FIG. 7.

By construction, the imaging axis A1, i.e. the viewing axis of the imaging unit B1, is at an acute angle P to the horizontal when the device is put down with the imaging unit B1 resting on a horizontal plane H.

In accordance with the invention, the acute angle P is chosen to correspond substantially to the pentoscopic angle of the commonest eyeglass frames.

It is therefore in the order of 10°.

In the embodiments shown the base C1 of the imaging view B1 is formed directly by the bottom edge 21 of its casing 13.

It is therefore plane and is at an acute angle P' to the semi-transparent plate 14 which is equal to 90° less the acute angle P.

In the embodiment shown the casing 13 of the imaging unit B1 has a front part 13' which carries the semi-transparent plate 14 and a rear part 13" set back relative to the front part 13' which is narrower but deeper and houses the image acquisition device and at least some of the components associated with it.

In accordance with the invention, the imaging unit B1 is mounted on the observation unit B2 to pivot freely about the pivot axis A3.

As shown in here, for example the observation unit B2 has two lateral flanges 22 for this purpose and by means of which it is fitted, in the manner of a yoke, onto the casing 13 of the imaging unit B1, engaging journal fashion with the lateral edges 23 of the latter.

The corresponding pivoting mounting will be obvious to the skilled person and is therefore not described here and is not shown in the figures.

The pivoting mounting can employ hollow journals, if required, and the latter can be used to pass wires, not shown, normally connecting the image acquisition device 11 of the imaging unit B1 and the viewing screen 12 of the observation B2.

In the embodiment shown the observation unit B2 includes to the rear of the imaging unit B1 a crossmember 25 extending between its two flanges 22 and carrying the oblique viewing screen 12 in its middle portion.

The crossmember 25 can have the same thickness across all or part of the height of the observation unit B2 or be extended upwards and/or downwards over at least part of the height of the observation unit by a thinner flange.

As in the embodiment shown, the imaging device 10 of the invention is preferably portable.

As shown here, for example, its observation unit B2 is therefore equipped with holding means 26 to facilitate manipulation of the system by the practitioner.

In the embodiment shown, the holding means 26 comprise two handles 27 extending along respective lateral edges of the observation unit B2, to the rear of the imaging unit B1, in the immediate vicinity of the flanges 22 of the observation unit B2, and each incorporating an opening 28.

As shown here, for example, the handles 27 are substantially parallel to each other and substantially perpendicular to the semi-transparent plate 14 of the imaging unit B1, the rear part 13" of the casing 13 of the latter lying between them.

Figure 6:
FIG. 6 is a side view similar to that of FIGS. 4 and 5 for the idle position of the imaging device of the invention.

As in the embodiment shown, the observation unit B2 preferably has a base C2 enabling the device to be put down with the observation unit B2 resting on a horizontal plane H, as shown in FIG. 6.

By construction, and subject to the following remark, the imaging axis A1 of the imaging unit B1 is at an acute and P to the horizontal when the device is put down in this way with the observation unit B2 resting on a horizontal plane H.

This acute angle P is then the same as previously.

It is therefore in practise in the order of 10°.

In the embodiment shown the base C2 of the observation unit B2 is formed by the bottom surface 29 of the two handles 27 of the observation unit B2.

This bottom surface 29 is therefore substantially plane.

In accordance with the invention, it is at an acute angle P' to a bearing surface D on the observation unit B2 for the imaging unit B1.

As shown here, for example, the bearing surface D is formed directly by the front surface 30 of the handles 27.

In the embodiment shown the observation unit B2 has a control panel 31 which the practitioner uses to control the device.

The control panel 31 is on the back of one of the handles 27, for example, so that it is accessible from the latter.

In the embodiment shown it is set obliquely at the top of the handle 27.

Figure 5:
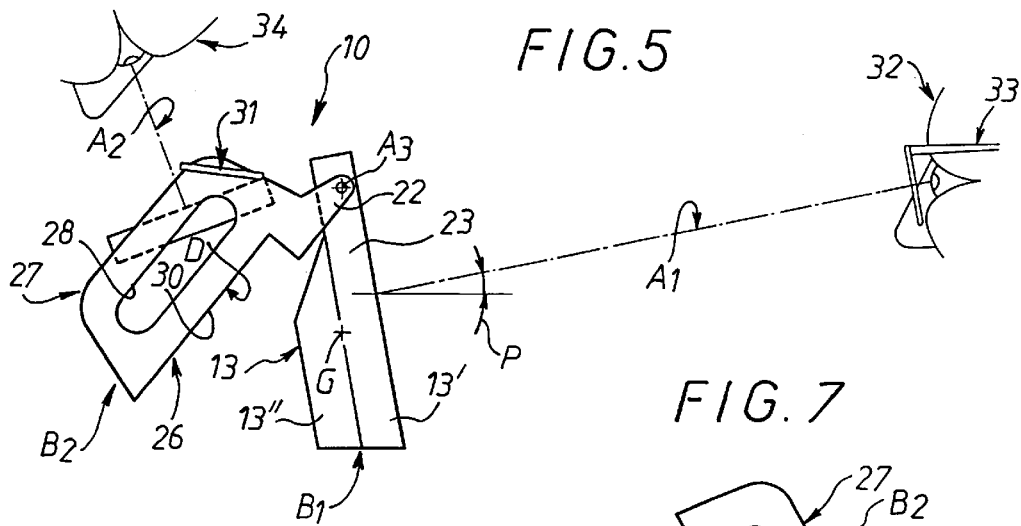
FIG. 5 is a side view similar to that for FIG. 4 for a second mode of framing the person.

To use the imaging device 10 of the invention, i.e. to acquire an image of a person 32 wearing an eyeglass frame 33 to be fitted with lenses using the imaging device 10, as shown in FIGS. 4 and 5, when the corresponding observation is for distant vision the practitioner 34 merely has to take the handles 27 of the observation unit B2 of the imaging device 10 in both hands and point the unit towards the person 32.

The practitioner 34 holds the imaging device 10 of the invention at an appropriate height for framing the person 32 conveniently, according to whether the person is tall (FIG. 4) or short (FIG. 5).

In all cases, and by virtue of the arrangement in accordance with the invention, the imaging unit B1 is always in the same orientation, due to gravity alone, with its center of gravity G vertically below the pivot axis A3 of the device so that, by virtue of the constructional arrangements previously described, the imaging axis A1 is systematically at an acute angle P to the horizontal.

The acute angle P being substantially equal to the pentoscopic angle of the eyeglass frame 33, i.e. the angle to the vertical of the median plane M of the rims or surround 35 of the eyeglass frame 33, as indicated in FIG. 4, the imaging axis A1 is therefore and advantageously always substantially perpendicular to the median plane M, which avoids any parallax error, which is the required result.

When the imaging device 10 of the invention is put down with the base C2 provided for this purpose on its observation unit B2 resting on a horizontal plane H, the imaging axis A1 of the imaging unit B1 is still at an acute angle P to the horizontal whether the imaging unit B1 is still hanging freely relative to the observation unit B2, pendulum fashion, as previously, or resting against the bearing surface D provided for this purpose on the observation unit B2 with the lateral edges of the front part 13' of its casing 13 bearing against the latter.

As previously indicated, for this rest position the acute angle P is preferably increased by an angle in the order of 15° to allow for the inclination of the head to the vertical that is usual in the circumstances, the imaging axis A1 of the imaging unit B1 being then at an acute angle P''' to the horizontal.

The rest position of the imaging device 10 in accordance with the invention can therefore also constitute an imaging position, in particular for near vision image acquisition.

However, as previously indicated and as shown in FIG. 7, the imaging device 10 of the invention can also be put down with the base C1 provided for this purpose on the imaging unit B1 resting on the horizontal plane H.

In accordance with the invention, the amplitude or relative angular movement between the imaging movement B1 and the observation unit B2 is, by construction, sufficient to allow the observation unit B2 to occupy an inverted position in which its viewing screen 12 is visible from the front, as shown in FIG. 7.

In other words, in this case, the observation axis A2 is also directed towards the front.

Conjointly, the image shown is itself inverted.

It is therefore possible for the person concerned, i.e. the wearer of the eyeglasses to observe their image on the viewing screen 12. This is either an image previously captured by the imaging unit B1 and stored or an instantaneous image, in either case inverted and therefore seen the right way up.

In other words, the image is the right way up, with a mirror image effect.

As in the embodiment shown here, when it is put down with its imaging unit B1 resting on a horizontal plane H and with the observation unit B2 in the inverted position, the viewing screen 12 of the observation unit B2 is preferably substantially vertical.

A locking button, not shown, can naturally be provided for controlled immobilization of the observation unit B2 when it is in the inverted position.

The foregoing description assumes that the center of gravity G of the imaging unit B1, the position of which depends on the distribution of masses within the unit, is fixed.

In accordance with a further feature of the invention, the center of gravity G is preferably adjustable in position for optimum adjustment of the acute angle P to the horizontal of the imaging axis A1 of the imaging unit B1.

By virtue of arrangements that will be evident to the skilled person and therefore are not described here, the power supply device 20 associated with the image acquisition device 11 is itself adjustable in position from front to rear inside the casing 13 of the imaging unit B1, between the back 15 of the casing 13 and the semi-transparent plate 14, and transversely relative to the pivot axis A3, as symbolized in chain-dotted line $20_I$, $20_{II}$ in FIG. 8.

A pointer 36 attached to the power supply device 20 projects out of the casing 13 through a slot 37 in the latter's corresponding lateral edge 23 to provide an external indication of the position of the power supply device 20 and therefore the value of the acute angle P.

The rear part 13'' of the casing 13 then extends the full width of the front part 13', in order for the pointer 36 to have a continuous path of movement.

FIGS. 9 and 10 show a further feature of the invention which can be used in particular when the observation unit B2 can move from the upright position shown in FIGS. 6 and 9 to the inverted position shown in FIGS. 7 and 10, as described with reference to FIGS. 6 and 7.

In accordance with this feature of the invention, the imaging device 10 of the invention includes detector means 39 responsive to the position of the observation unit B2 and controlling inverter means 40 for inverting the image shown on the viewing screen 12 when the observation unit B2 is in the inverted position.

The inversion of the image that is required for it to be seen the right way up is then brought about automatically, which is advantageous.

The detector means 39 employed for this purpose can comprise a position sensor available off the shelf.

In the embodiment shown it is housed in a box section 41 the front of which supports the viewing screen 12 and includes a conductive weight 42, for example a ball bearing as shown here or a volume of mercury, freely moveable in a chamber 43 and forming the mobile contact of a switch 44.

In the upright position of the observation unit B2 the switch 44 is open (FIG. 9) and in its inverted position it is closed (FIG. 10), the force required to release the conductive weight 42 being exceeded in this position.

The inverter means 40 employ an electrical circuit, not shown, which is part of an electronic circuit card 45, for example, as shown here, and into at least part of which the switch 44 is connected.

The electronic circuit card 45 controlling the viewing screen 12 preferably manages two superposed display layers, one having a high color capacity for displaying the image of the person concerned and the other having a low color capacity for the overlaid display of at least one other image of any kind, for example an image containing information such as a text and/or lines and/or figures, for example.

These two images are of course stored in memory independently of each other.

By virtue of arrangements that will be obvious to the skilled person and are therefore not described here, the inverter means 40 are then adapted to invert the image of the person relative to a horizontal axis of symmetry and the other image, i.e. the information-bearing image, relative to a horizontal axis of symmetry and relative to vertical axis of symmetry.

This compensates the visual effect of inversion.

In particular, the person then sees themselves as if reflected in a mirror when the viewing screen 12 is positioned as shown in FIG. 7 and when the viewing screen 12 is positioned as shown in FIG. 6 the operator sees the person as if they were facing them.

Of course, the present invention is not limited to the embodiments described and shown but encompasses any variant execution or use thereof.

In particular, the imaging device of the invention can be used to show different frames on the person's face, either "physical" frames or "virtual" frames.

It is possible also to display the stored image of the face on which a "virtual" image of a frame is superimposed.

There is claimed:

1. An imaging device comprising a first, imaging unit including an image acquisition device for acquiring an image of a scene and having an imaging axis, the imaging axis being linked to the orientation of the image acquisition device, and a second, observation unit including a viewing screen for displaying an image corresponding to the scene having an observation axis, the orientation of the second, observation unit being linked to the observation axis, means hingedly connecting the first and second units together about a horizontal pivot axis, said first, imaging unit have a center of gravity located below the pivot axis, said first, imaging unit having a predetermined orientation in each of a plurality of orientations of said second, observation unit.

2. An imaging device according to claim 1, wherein said imaging acquisition unit defines means for acquiring an image of a person wearing eyeglasses including a frame having a median plane, said imaging axis being perpendicular to the me median plane of the eyeglass frame.

3. An imaging device according to claim 1, wherein said imaging acquisition unit defines means for acquiring an image of a person wearing eyeglasses including a frame oriented at a pentascopic angle, said imaging axis being inclined to horizontal at an angle about 15° greater than said pentascopic angle.

4. An imaging device according to claim 1, wherein said imaging axis is inclined at angle of about 15° relative to the horizontal.

5. An imaging device according to claim 1, wherein said predetermined orientation of said first, imaging unit for each of the plurality of orientation of said second, observation unit is determined by free pivotal movement of said imaging unit under the force or gravity.

6. An imaging device according to claim 1, further comprising means for adjusting the center of gravity of said first, imaging unit.

7. An imaging device according to claim 1, wherein said second, observation unit has holding means accessible to a practitioner, for hand-holding the imaging device, said plurality of orientations corresponding to hand-held positions of said second, observation unit.

8. An imaging device according to claim 7, wherein said holding means comprise two handles extending along respective lateral edges of said second, observation unit.

9. An imaging device according to claim 8, wherein said second, observation unit has a base for supporting the imaging device on a substantially horizontal support surface, said base being defined by bottom surfaces of said two handles.

10. An imaging device according to claim 9, wherein said bottom surfaces of said two handles are substantially planar and make an acute angle relative to said bearing surface of said first, imaging unit.

11. An imaging device according to claim 1, wherein said first, imaging unit has a base for supporting the imaging device at an orientation substantially the same as said predetermined orientation.

12. An imaging device according to claim 11, wherein said second, observation unit has at least one position located substantially entirely above said first, imaging unit when said first, imaging unit is supported by its base for observation by the person being viewed by the first, imaging unit.

13. An imaging device according to claim 11, wherein said second, observation unit has a base for supporting the imaging device, said first, imaging unit having an orientation substantially the same as said predetermined orientation determined by abutment of one of said units relative to the other of said units.

14. An imaging device according to claim 1, said imaging unit further including a casing and said image acquisitions device having an associated power supply mounted in said casing, said power supply being adjustable transversely relative to said pivot axis for adjusting the center of gravity of said first, imaging unit.

15. An imaging device according to claim 14, wherein said power supply is located below said image acquisition device.

16. An imaging device according to claim 1, wherein said first, imaging unit having a front with a semi-transparent plate perpendicular to said imaging axis and concealing said image acquisition device.

17. An imaging device according to claim 16, wherein said imaging axis is parallel to said semi-transparent plate, a mirror being oriented at 45° between said image acquisition device and said semi-transparent plate.

18. An imaging device according to claim 16, wherein said first, imaging unit includes an internal light source.

19. An imaging device according to claim 1, wherein said second, observation unit has a base for supporting the imaging device when said base bears on a substantially horizontal support surface.

20. An imaging device according to claim 19, wherein said imaging axis is oriented at an acute angle relative to the substantially horizontal support surface when the base of said second, observation unit bears on a substantially horizontal support surface.

21. An imaging device according to claim 1, wherein said first, imaging unit has a base for supporting the imaging device on a substantially horizontal support surface.

22. An imaging device according to claim 21, wherein said imaging axis is located at an acute angle in relation to said substantially horizontal support surface when said imaging unit base bears on said substantially horizontal support surface.

23. An imaging device according to claim 22, wherein said second, observation unit has a range of angular movement relative to said first, imaging unit to an inverted position where said viewing screen is visible from the same side of said imaging device as said first imaging unit, said second, observation unit being substantially vertical when said first, imaging unit bears on a substantially horizontal support surface.

24. An imaging device according to claim 1, wherein said second, observation unit has a range of angular movements relative to said first, imaging unit to an inverted position wherein said viewing screen is visible from the same side of said imaging device as said first, imaging unit.

25. An imaging device according to claim 23, further comprising detector means responsive to the position of the second, observation unit and controlling inverter means for inverting an image displayed on said viewing screen when said second, observation unit is in said inverted position.

26. An imaging device according to claim 25, wherein said viewing screen has two superposed display layers, one of said superposed display layers being for displaying an image of a person being viewed and the other of said superposed display layers being for displaying at least one other image, said inverter means being adapted to invert the image of the person relative to a horizontal axis of symmetry and the other image relative to a horizontal axis of symmetry and a vertical axis of symmetry.

27. A portable imaging device comprising a first, imaging unit including an image acquisition device having an imaging axis, the imaging axis being linked to the orientation of the image acquisition device, and a second, observation unit including a viewing screen having an observation axis, the orientation of the second unit being linked to the observation axis, means hingedly connecting the first and second units together about a horizontal pivot axis, said first, imaging unit have a center of gravity located below the pivot axis, said second, observation unit having a plurality of orientations and said first, imaging unit having the same, predetermined orientation in each of the plurality of orientations of said second, observation unit, one of said units having handle means for hand-holding the portable imaging device.

28. An imaging device comprising a first, imaging unit including a camera for taking images of a scene, the camera having a shooting axis, the shooting axis of the camera being linked to the orientation of the camera, a second, observation unit including a display screen for displaying an image corresponding to the scene, the display screen having a display axis, the orientation of the second unit being linked to the display axis, means hingedly connecting the first and second units together about a horizontal axis, the first, imaging unit having a center of gravity located below the pivot axis.

* * * * *